US009007997B2

(12) United States Patent
Moon et al.

(10) Patent No.: US 9,007,997 B2
(45) Date of Patent: Apr. 14, 2015

(54) METHOD FOR SETTING A CARRIER INDICATION FIELD IN A MULTI-CARRIER SYSTEM

(75) Inventors: Sung Ho Moon, Anyang-si (KR); Min Seok Noh, Anyang-si (KR); Jae Hoon Chung, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 13/637,975

(22) PCT Filed: Mar. 29, 2011

(86) PCT No.: PCT/KR2011/002144
§ 371 (c)(1),
(2), (4) Date: Jan. 9, 2013

(87) PCT Pub. No.: WO2011/122825
PCT Pub. Date: Oct. 6, 2011

(65) Prior Publication Data
US 2013/0163525 A1 Jun. 27, 2013

Related U.S. Application Data

(60) Provisional application No. 61/318,796, filed on Mar. 30, 2010.

(30) Foreign Application Priority Data

Jan. 19, 2011 (KR) ........................ 10-2011-0005234

(51) Int. Cl.
*H04W 4/00* (2009.01)
*H04B 7/216* (2006.01)
*H04W 72/04* (2009.01)
*H04L 5/00* (2006.01)

(52) U.S. Cl.
CPC .............. *H04W 72/042* (2013.01); *H04L 5/001* (2013.01); *H04L 5/0094* (2013.01)

(58) Field of Classification Search
USPC .................................................. 370/329–338
See application file for complete search history.

(56) References Cited

U.S. PATENT DOCUMENTS

2011/0243066 A1* 10/2011 Nayeb Nazar et al. ....... 370/328
2012/0327910 A1* 12/2012 Dalsgaard et al. ............ 370/335

OTHER PUBLICATIONS

Panasonic, "Component carrier indication scheme for carrier aggregation", R1-093465, 3GPP TSG-RAN WG1 Meeting #58, Aug. 2009.
Alcatel-Lucent, "Component carrier indication for bandwidth extension in LTE-A", R1-093362, 3GPP TSG-RAN WG1 #58, Aug. 2009.
Samsung Electronics, "Radio Interface Technology for IMT-Advanced: 3GPP LTE-Advanced", Nov. 2009.

* cited by examiner

*Primary Examiner* — Brandon Renner
(74) *Attorney, Agent, or Firm* — Lee, Hong, Degerman, Kang & Waimey

(57) ABSTRACT

Disclosed is a method for setting a carrier indication field indicating an element carrier in a multi-carrier system using a plurality of element carriers. The method includes: transmitting a value of a carrier indication field (CIF) and first CIF setting information that indicates a first mapping relationship between element carriers; transmitting downlink control information (DCI) including a carrier indication field; and transmitting a value of a CIF and second CIF setting information that indicates a second mapping relationship between element carriers, wherein the carrier indication field is a field indicating any one of the plurality of element carriers, and at least one element carrier is mapped with the same carrier indication field value in the first and second mapping relationships.

12 Claims, 20 Drawing Sheets (a) # of DL CC (component carrier) ># of UL CC (b) # of UL CC > # of DL CC FIG. 9
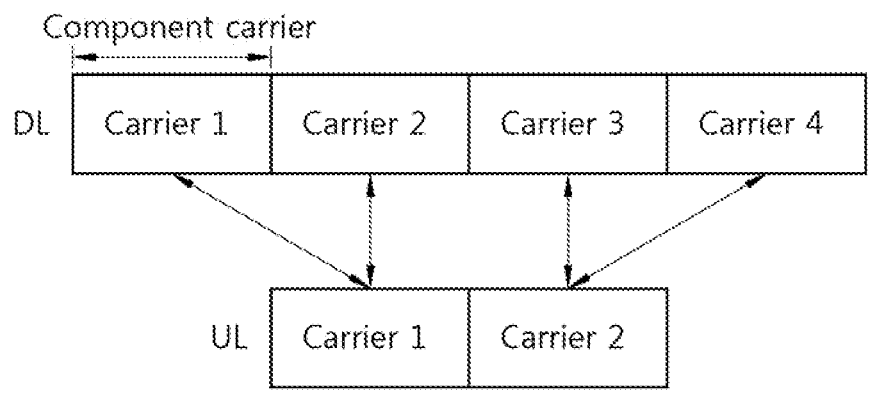
(a) # of DL CC (component carrier) ># of UL CC
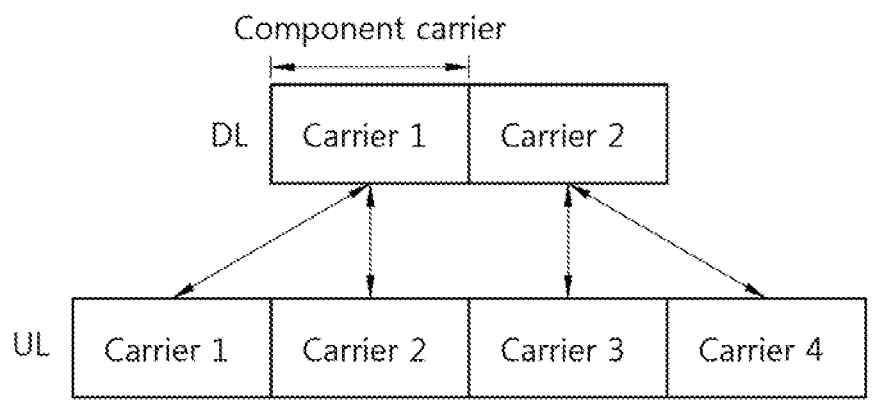
(b) # of UL CC > # of DL CC FIG. 16
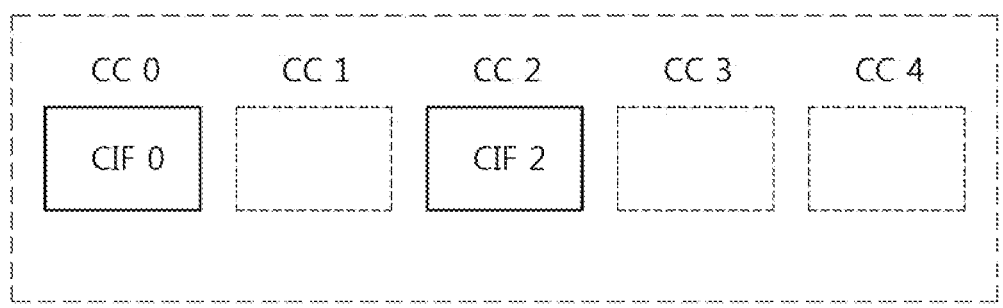
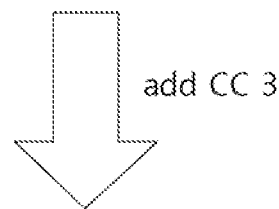
add CC 3
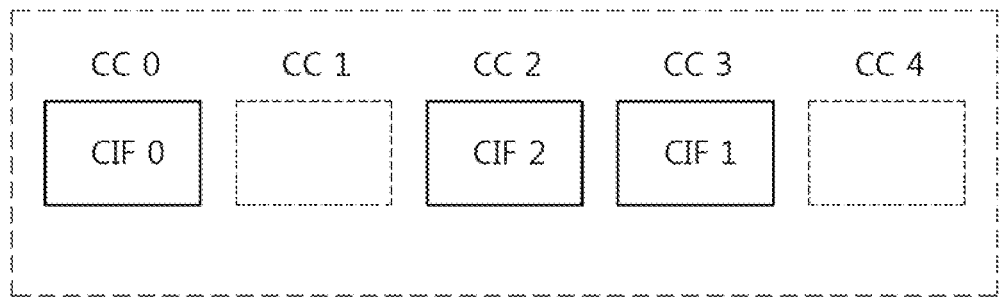

FIG. 18
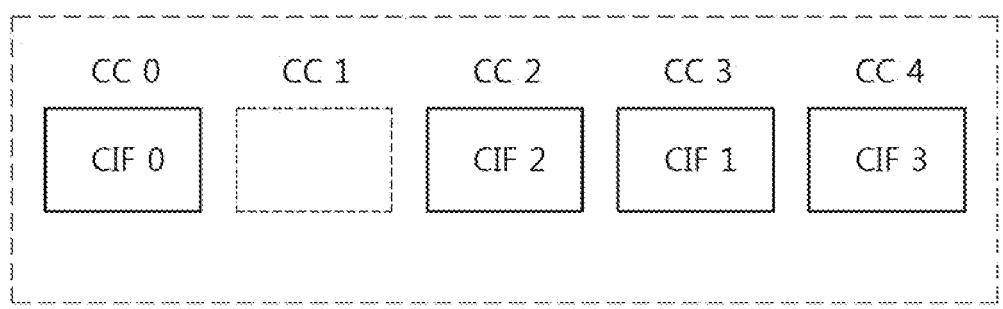
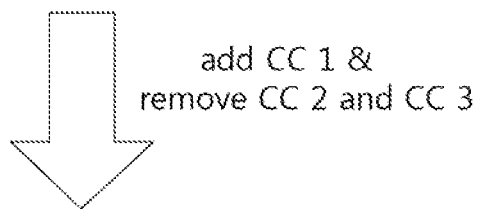
add CC 1 & remove CC 2 and CC 3
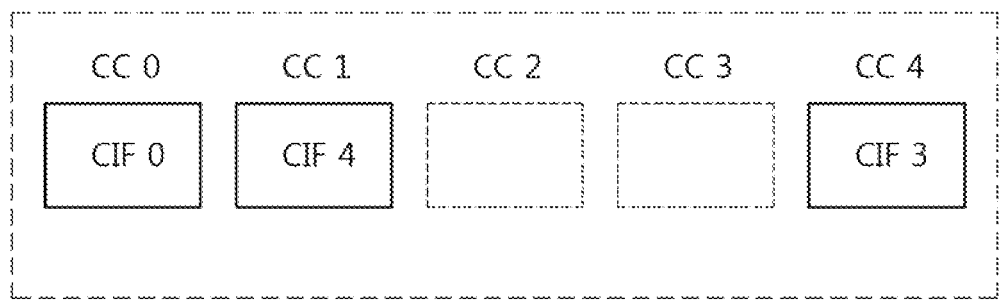

METHOD FOR SETTING A CARRIER INDICATION FIELD IN A MULTI-CARRIER SYSTEM

CROSS-REFERENCE TO RELATED APPLICATIONS

This application is the National Stage filing under 35 U.S.C. 371 of International Application No. PCT/KR2011/002144, filed on Mar. 29, 2011, which claims the benefit of earlier filing date and right of priority to Korean Patent Application No. 10-2011-0005234, filed on Jan. 19,2011, and also claims the benefit of U.S. Provisional Application Ser. No. 61/318,796, filed on Mar. 30, 2010, the contents of which are all hereby incorporated by reference herein in their entirety.

TECHNICAL FIELD

The present invention relates to wireless communication and more specifically to a method for setting a carrier indication field in a multi-carrier system.

BACKGROUND ART

One requirement for next-generation wireless communication systems is to be able to support a high data transmission rate. For this purpose, there is ongoing research, such as MIMO (Multiple Input Multiple Output), CoMP (Cooperative Multiple Point Transmission), or relays, but the most fundamental and stable method is to broaden bandwidth.

However, frequency resources are now in saturation, and various technologies are used to occupy a wide range of frequency bands. To meet demand for a higher data transmission and secure a broader bandwidth, the concept of carrier aggregation (CA) has been introduced which ties a number of bands into a single system and provides a design that may satisfy the basic requirement that each spread band may operate an independent system. At this time, the band which enables each independent operation is defined as a component carrier (CC).

To support increasing transmission capacity, recent communication standards, e.g., 3GPP LTE-A or 802.16m, consider expanding the bandwidth up to 20 MHz or more. In such case, one or more component carriers are aggregated to support the broadband. For example, if a single component carrier corresponds to a bandwidth of 5 MHz, four carriers are aggregated to support the maximum of a bandwidth of 20 MHz. As such, the carrier aggregation system uses multiple component carriers, and may be in this sense referred to as a "multi-carrier system".

In the multi-carrier system, component carriers assigned to a terminal may change for various reasons, such as channel environments or amount of data transmitted. For example, a terminal which is now in communication with two component carriers may be assigned with one more carrier, so that three carriers in total may end up being assigned to the terminal. Or, while communication is underway with three component carriers assigned, one of them may be removed thereby leaving two component carriers assigned. As such, in the case that the component carriers assigned to a terminal vary, mapping between the component carriers and the value in the carrier indication field, which indicates the component carrier may also change. At this time, it needs to be clearly specified how the value in the carrier indication field is mapped with the component carrier.

DISCLOSURE

Technical Problem

An object of the present invention is to provide a method of setting a carrier indication field that indicates a component carrier in a multi-carrier system.

Technical Solution

According to an aspect of the present invention, a method of setting a carrier indication field that indicates a component carrier in a multi-carrier system that uses a plurality of component carriers, the method includes transmitting a first CIF setting information that notifies a first mapping relationship between a CIF (Carrier Indication Field) value and a component carrier, transmitting downlink control information (DCI) including the carrier indication field, and transmitting a second CIF setting information that notifies a second mapping relationship between a CIF value and a component carrier, wherein the carrier indication field is a field indicating one of the plurality of component carriers, and wherein at least one component carrier is mapped with the same carrier indication field value in the first mapping relationship and the second mapping relationship.

The first CIF setting information and the second CIF setting information may be transmitted through the at least one component carrier.

The downlink control information may be transmitted through the at least one component carrier.

The carrier indication field may have a size of 3 bits.

The first CIF setting information and the second CIF setting information may be included in a RRC (Radio Resource Control) message and transmitted.

When there is a component carrier added with respect to component carriers mapped in the first mapping relationship among component carriers mapped in the second mapping relationship, a smallest value or a largest value among available carrier indication field values may be mapped with the added component carrier.

When there is a component carrier removed with respect to component carriers mapped in the first mapping relationship among component carriers mapped in the second mapping relationship, carrier indication field values mapped with the remaining component carriers other than the removed component carrier among component carriers mapped in the second mapping relationship are kept the same as in the first mapping relationship.

When there is an added component carrier and a removed component carrier with respect to component carriers mapped in the first mapping relationship among component carriers mapped in the second mapping relationship, a smallest value or a largest value among available carrier indication field values for the added component carrier may be first mapped.

Advantageous Effects

According to the present invention, although the component carrier assigned to the terminal in the multi-carrier system changes, data and control signals may be transmitted between the terminal and the base station without errors.

DESCRIPTION OF DRAWINGS

FIG. 9 illustrates an example of a DL/UL asymmetric carrier aggregation system according to the present invention.

FIGS. 15 to 19 illustrate examples of settings of CCs and CIF values.

MODE FOR INVENTION

The following technology may be used for various wireless communication systems, such as CDMA (Code Division Multiple Access), FDMA (Frequency Division Multiple Access), TDMA (Time Division Multiple Access), OFDMA (Orthogonal Frequency Division Multiple Access), or SC-FDMA (Single Carrier Frequency Division Multiple Access). CDMA may be implemented as a radio technology, such as CDMA2000. TDMA may be implemented as radio technologies, such as GSM (Global System for Mobile communications)/GPRS (General Packet Radio Service)/EDGE (Enhanced Data Rates for GSM Evolution). OFDMA may be implemented as radio technologies, such as IEEE 802.11 (Wi-Fi), IEEE 802.16 (WiMAX), IEEE 802-20, or E-UTRA (Evolved UTRA). IEEE 802.16m is an advanced version of IEEE 802.16e and provides backward compatibility with IEEE 802.16e-based systems. UTRA is part of UMTS (Universal Mobile Telecommunications System). 3GPP (3rd Generation Partnership Project) LTE (Long Term Evolution) is part of E-UMTS (Evolved UMTS) using E-UTRA (Evolved-UMTS Terrestrial Radio Access) and adopts OFDMA for downlink and SC-FDMA for uplink. LTE-A (Advanced) is an advanced version of 3GPP LTE.

For clarity of description, assume that the present invention applies to an LTE-A system. However, the technical spirit of the present invention is not limited thereto.

Figure 1:
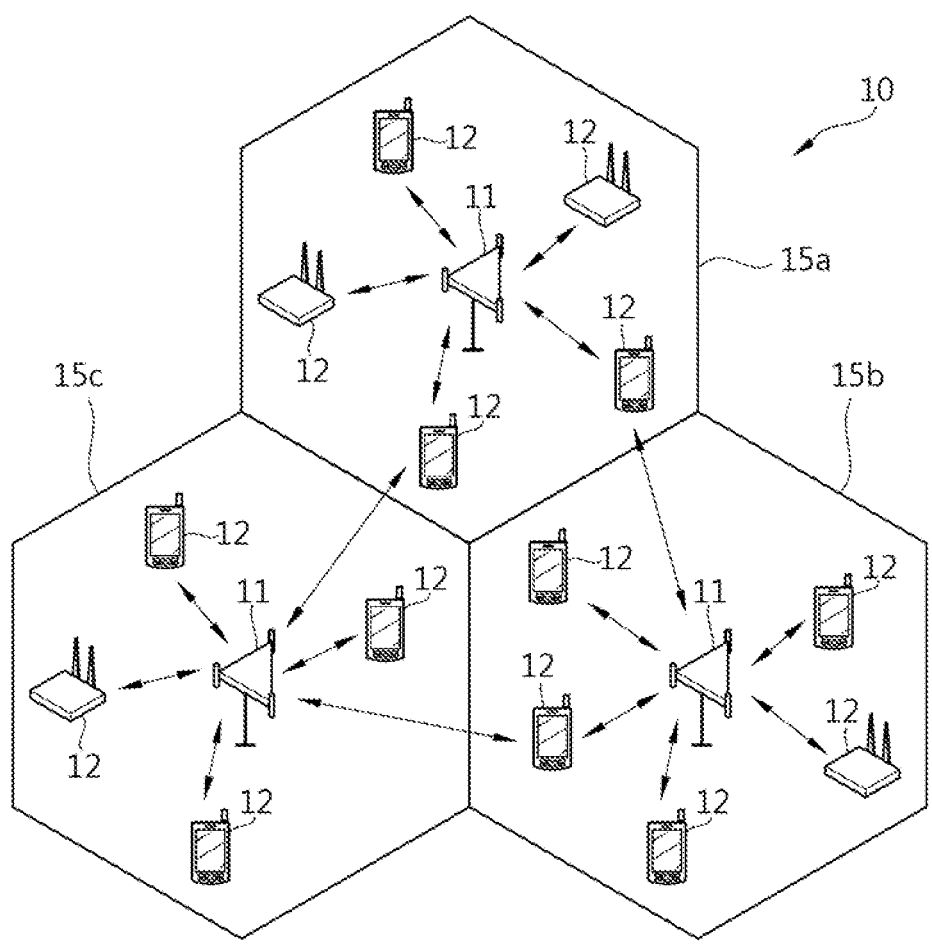
FIG. 1 illustrates an example of a wireless communication system according to an embodiment of the present invention.

FIG. 1 illustrates an example of a wireless communication system according to an embodiment of the present invention.

The wireless communication system 10 includes at least one base station (BS) 11. Each base station 11 provides a communication service over a specific geographical region (which is generally referred to as a "cell") 15a, 15b, or 15c. The cell may be divided into a plurality of regions (which are called "sectors"). A user equipment (UE) 12 may be stationary or have mobility, and may be also referred to by other terms, such as MS (Mobile Station), MT (Mobile Terminal), UT (User Terminal), SS (Subscriber Station), wireless device, PDA (Personal Digital Assistant), wireless modem, or handheld device. The base station 11 generally refers to a fixed station which communicates with the user equipment 12 and may be also referred to by other terms, such as eNB (evolved-NodeB), BTS (Base Transceiver System), or access point.

A user equipment generally belongs to a cell. The cell to which the user equipment belongs to is called a "serving cell". A base station which provides a communication service to the serving cell is called a "serving BS". The wireless communication system may be a cellular system. Another cell adjacent to the serving cell may be present. The cell adjacent to the serving cell is called a "neighbor cell". A base station which provides a communication service to the neighbor cell is called a "neighbor BS". The serving cell and the neighbor cell are relatively determined with respect to the terminal.

In general, downlink refers to communication from the base station 11 to the user equipment 12, and uplink refers to communication from the user equipment 12 to the base station 11.

The wireless communication system may be one of a MIMO (Multiple-In Multiple-Out) system, a MISO (Multiple Input Single Output) system, a SISO (single input single output) system, and a SIMO (single input multiple output) system. The MIMO system uses multiple transmit antennas and multiple receive antennas. The MISO system uses multiple transmit antennas and a single receive antenna. The SISO system uses a single transmit antenna and a single receive antenna. The SIMO system uses a single transmit antenna and multiple receive antennas.

The transmit antenna refers to a physical or logical antenna that is used for transmitting a signal or stream, and the receive antenna refers to a physical or logical antenna that is used for receiving a signal or stream.

Figure 2:
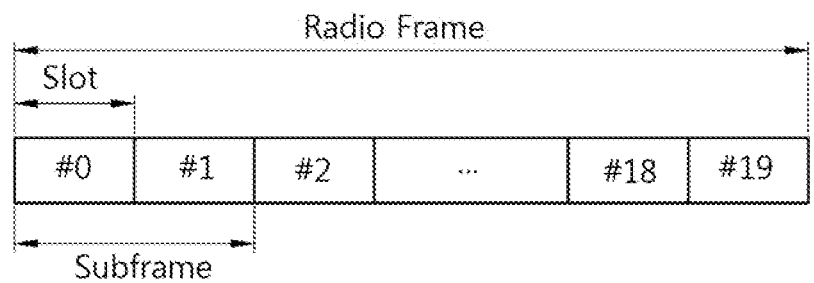
FIG. 2 illustrates a structure of a radio frame in 3GPP LTE.

FIG. 2 illustrates a structure of a radio frame in 3 GPP LTE.

Refer to Ch. 5, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)". Referring to FIG. 2, the radio frame includes 10 subframes, each of which includes two slots. The slots in the radio frame are numbered from #0 to #19. Time taken for a subframe to be transmitted is referred to as a TTI (Transmission Time Interval). The TTI may be a scheduling unit for data transmission. For example, the length of a radio frame is 10 ms, the length of a subframe is 1 ms, and the length of a slot is 0.5 ms.

One slot includes a plurality of OFDM (Orthogonal Frequency Division Multiplexing) symbols in the time domain and includes a plurality of subcarriers in the frequency domain. The OFDM symbol represents a symbol period. The OFDM symbol may be called by other names. For example, the OFDM symbol may be also called OFDMA (Orthogonal Frequency Division Multiple Access) symbol or SC-FDMA symbol when SC-FDMA (single carrier-frequency division multiple access) is used for an uplink multiple access scheme.

3GPP LTE defines that in normal cyclic prefix (CP) one slot includes seven OFDM symbols and that in the extended CP one slot includes six OFDM symbols.

The radio frame structure is merely an example. Accordingly, the number of subframes in the radio frame, the number of slots in the subframe, or the number of OFDM symbols in the slot may vary.

Figure 3:
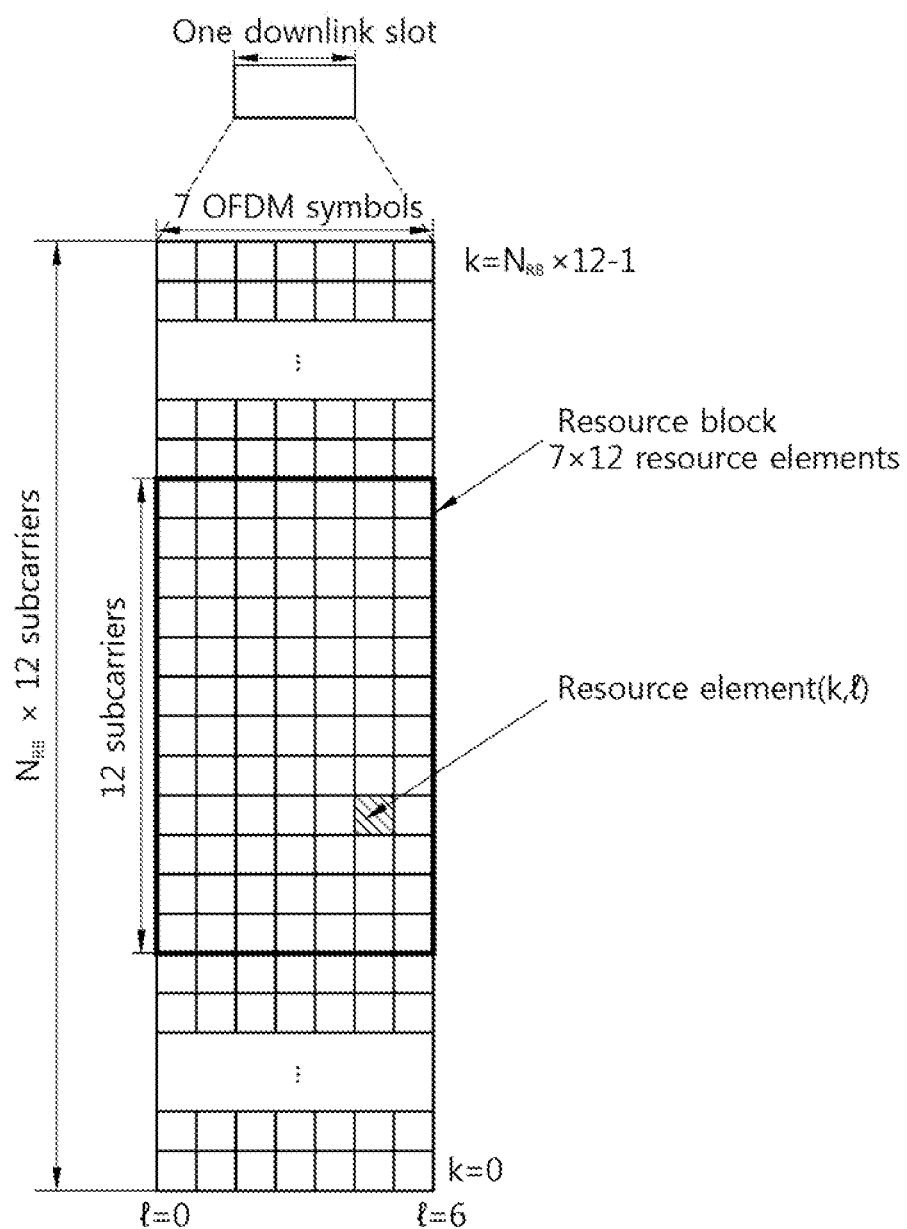
FIG. 3 illustrates an example of a resource grid for one downlink slot.

FIG. 3 illustrates an example of a resource grid for one downlink slot.

The downlink slot includes a plurality of OFDM symbols in the time domain and $N_{RB}$ resource blocks in the frequency domain. The resource block is a resource assigning unit and includes one slot in the time domain and a plurality of consecutive subcarriers in the frequency domain.

$N_{RB}$, which is the number of the resource blocks included in the downlink slot, depends upon a downlink transmission bandwidth set in a cell. For example, in the LTE system, $N_{RB}$ may be one of 60 to 110. The structure of an uplink slot may be also the same as the structure of the downlink slot.

Each element in the resource grid is called a resource element (RE). The resource element in the resource grid may be identified by an index pair (k, 1) in the slot. Here, k(k= 0, . . . , $N_{RB} \times 12-1$) is a subcarrier index in the frequency domain, and 1 (1=0, . . . , 6) is an OFDM symbol index in the time domain.

As an example, one resource block includes seven OFDM symbols in the time domain and twelve subcarriers in the frequency domain, thereby including 7×12 resource elements. However, the number of OFDM symbols or subcarriers in the resource block is not limited thereto. The number of OFDM symbols and the number of subcarriers may vary depending on the length of CP or frequency spacing. For example, in the case of normal CP, the number of OFDM symbols is 7, and in the case of extended CP, the number of OFDM symbols is 6. The number of subcarriers in one OFDM symbol may be selected from among 128, 256, 512, 1024, 1536 and 2048.

Figure 4:
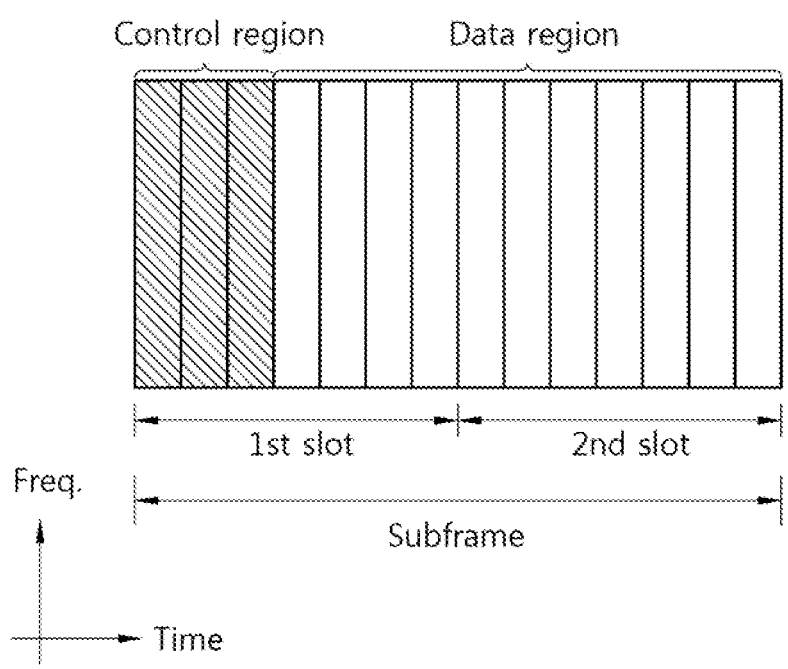
FIG. 4 illustrates a structure of a downlink subframe.

FIG. 4 illustrates a structure of a downlink subframe.

The downlink subframe includes two slots in the time domain, and each slot includes 7 OFDM symbols in the normal CP. In the subframe, the first maximally three OFDM symbols (maximally four OFDM symbols in the bandwidth of 1.4 MHz) in the first slot are a control region to which control channels are assigned, and the remaining OFDM symbols are a data region to which PDSCHs (Physical Downlink Shared Channels) are assigned. The PDSCH refers to a channel through which the base station transmits data to the user equipment.

Through the control region, PCFICH (Physical Control Format Indicator CHannel), PHICH (Physical Hybrid ARQ Indicator Channel), or PDCCH (Physical Downlink Control CHannel) may be transmitted. The PCFICH is a physical channel for transmission of a format indicator to the user equipment, the format indicator indicating the format of the PDCCH, that is, the number of OFDM symbols constituting the PDCCH. The PCFICH is included in each subframe. The format indicator may also be called a CFI (Control Format Indicator).

The PHICH conveys an HARQ ACK/NACK signal in response to the uplink transmission.

The PDCCH may convey resource allocation of DL-SCH (Downlink-Shared Channel) (which is also referred to as DL (Downlink) grant) and transmission format, resource allocation information of UL-SCH (Uplink Shared Channel) which is also referred to as UL (Uplink) grant), paging information over the PCH (paging channel), system information over DL-SCH, resource allocation of an upper layer control message, such as a random access response transmitted over PDSCH, a set of transmission power control (TPC) commands for individual UEs in some UE group, and activation of VoIP (Voice over Internet Protocol). The control information transmitted through PDCCH as described above is referred to as downlink control information (DCI).

The control region in the subframe includes a plurality of CCEs (Control Channel Elements). The CCE is a logical allocation unit that is used for providing PDCCH with an encoding rate according to the status of the radio channel and corresponds to a plurality of REGs (Resource Element Groups). According to correlation between the number of CCEs and the encoding rates provided by the CCEs, the format of PDCCH and the number of available bits of PDCCH are determined.

One REG includes four REs and one CCE includes 9 REGs. To configure one PDCCH, 1, 2, 4, or 8 CCEs may be used, and each element of {1, 2, 4, 8} is referred to as a CCE aggregation level.

The control channel constituted of one or more CCEs performs interleaving on the basis of REG, and after cyclic shift based on cell ID (Identifier) is performed, is mapped with the physical resource.

3GPP LTE uses blind decoding for detecting PDCCH. The blind decoding checks CRC errors by demasking a desired identifier on the CRC of the received PDCCH (which is referred to as candidate PDCCH), thereby identifying whether the corresponding PDCCH is its own control channel or not. The user equipment is not aware that its own PDCCH is transmitted to use what CCE aggregation level or DCI format at what position in the control region.

A plurality of PDCCHs may be transmitted in one subframe. The user equipment monitors the plurality of PDCCHs every subframe. Here, "monitoring" means that the user equipment attempts to decode the PDCCH according to the format of the monitored PDCCH.

3GPP LTE uses a search space for reducing load that occurs due to blind decoding. The search space may be a monitoring set of CCE for PDCCH. The user equipment monitors the PDCCH in the corresponding search space.

The search space may be categorized into a common search space and a UE-specific search space. The common search space is a space for searching the PDCCH having common control information and may be constituted of 16 CCEs ranging from CCE index 0 to CCE index 15, and supports PDCCH having a CCE aggregation level of {4, 8}. However, the PDCCH (DCI format 0, 1A) carrying the UE-specific information may be also transmitted in the common search space. The UE-specific search space supports PDCCH having a CCE aggregation level of {1, 2, 4, 8}.

The formats of existing DCIs transmitted over the PDCCH are described.

The DCI format includes fields to be described below, and the fields, respectively, may be mapped with information bits $a_0$ to $a_{A-1}$. The fields may be mapped in the order described in each DCI format, and each field may include padding bits "0". The first field may be mapped with the lowest order information bit $a_0$, and other consecutive fields may be mapped with higher order information bits. In each field, the most significant bit (MSB) may be mapped with the lowest order information bit in the corresponding field. For example, the most significant bit of the first field may be mapped with $a_0$. Hereinafter, the set of fields included in each existing DCI format is referred to as an information field.

1. DCI Format 0

DCI format 0 is used for PUSCH scheduling. Information (field) transmitted through DCI format 0 is as follows.

1) flag for distinguishing DCI format 0 from DCI format 1A (0 indicates DCI format 0, and 1 indicates DCI format 1A), 2) hopping flag (1 bit), 3) resource block designation and hopping resource allocation, 4) modulation and coding scheme and redundancy version (5 bits), 5) new data indicator (1 bit), 6) TPC command for scheduled PUSCH (2 bits), 7) cyclic shift for DM-RS (3 bits), 8) UL index, 9) downlink designation index (TDD only), and 10) CQI request. If the number of information bits in DCI format 0 is smaller than the payload size of DCI format 1A, '0' is padded so that the number becomes the same as the payload size of DCI format 1A.

2. DCI Format 1

DCI format 1 is used for scheduling one PDSCH codeword. The following information is transmitted through DCI format 1.

1) resource allocation header (indicating resource allocation type 0/type 1)—when the downlink bandwidth is smaller than 10 PRBs, no resource allocation header is included, and resource allocation type 0 is assumed, 2) resource block designation, 3) modulation and coding scheme, 4) HARQ process number, 5) new data indicator, 6) redundancy version, 7) TPC command for PUCCH, and 8) downlink designation index (TDD only). If the number of information bits in DCI format 1 is the same as in DCI format 0/1A, one bit whose value is 0 is added to DCI format 1. If the number of information bits in DCI format 1 is one of 12, 14, 16, 20, 24, 26, 32, 40, 44, and 56, bits having one or more 0's are added to DCI format 1 to have a payload size different from the payload size of DCI format 0/1A and {12, 14, 16, 20, 24, 26, 32, 40, 44, 56}.

3. DCI Format 1A

DCI format 1A is used for a random access process or compact scheduling for one PDSCH codeword.

The following information is transmitted through DCI format 1A. 1) flag to distinguish DCI format 0 from DCI format 1A, 2) localization/distribution VRB designation flag, 3) resource block designation, 4) modulation and coding scheme, 5) HARQ process number, 6) new data indicator, 7) redundancy version, 8) TPC command for PUCCH, and 9) downlink designation index (TDD only). If the number of information bits in DCI format 1A is smaller than the number of information bits in DCI format 0, bits having 0's are added to be the same as the payload size of DCI format 0. If the number of information bits in DCI format 1A is one of 12, 14, 16, 20, 24, 26, 32, 40, 44, and 56, a bit having 0 is added to DCI format 1A.

4. DCI Format 1B

DCI format 1B includes precoding information and is used for compact scheduling on one PDSCH codeword. DCI format 1B includes the following information.

1) localization/distribution VRB designation flag, 2) resource block designation, 3) modulation and coding scheme, 4) HARQ process number, 5) new data indicator, 6) redundancy version, 7) redundancy version for PUCCH, 8) downlink designation index (TDD only), 9) TPMI (transmitted precoding matrix indicator) information for precoding, and 10) PMI verification for precoding. If the number of information bits in DCI format 1B is one of 12, 14, 16, 20, 24, 26, 32, 40, 44, and 56, a bit having 0 is added to DCI format 1B.

5. DCI Format 1C

DCI format 1C is used for very compact scheduling on one PDSCH codeword. The following information is transmitted through DCI format 1C.

1) indicator indicating a gap value, 2) resource block designation, and 3) transmission block size index.

6. DCI Format 1D

DCI format 1D includes precoding and power offset information and is used for compact scheduling on one PDSCH codeword.

The following information is transmitted through DCI format 1D.

1) localization/distribution VRB designation flag, 2) resource block designation, 3) modulation and coding scheme, 4) HARQ process number, 5) new data indicator, 6) redundancy version, 7) TPC command for PUCCH, 8) downlink designation index (TDD only), 9) TPMI information for precoding, and 10) downlink power offset. If the number of information bits in DCI format 1D is one of 12, 14, 16, 20, 24, 26, 32, 40, 44, and 56, a bit having 0 is added to DCI format 1D.

7. DCI Format 2

DCI format 2 is used for PDSCH designation for closed-loop MIMO operation. The following information is transmitted through DCI format 2D.

1) resource allocation header, 2) resource block designation, 3) TPC command for PUCCH, 4) downlink designation index (TDD only), 5) HARQ process number, 6) transmission block and codeword swap flag, 7) modulation and coding scheme, 8) new data indicator, 9) redundancy version, and 10) precoding information.

8. DCI Format 2A

DCI format 2A is used for PDSCH designation for open-loop MIMO operation. The following information is transmitted through DCI format 2A.

1) resource allocation header, 2) TPC command for PUCCH, 3) downlink designation flag (TDD only), 4) HARQ process number, 5) transmission block and codeword swap flag, 6) modulation and coding scheme, 7) new data indicator, 8) redundancy version, and 9) precoding information.

9. DCI Format 3

DCI format 3 is used for transmitting TPC commands for PUCCH and PUSCH by power control of 2 bits.

The following information is transmitted through DCI format 3.

1) N TPC (Transmit Power Control) commands. Here, N is determined by the following equation 1:

$$N = \left\lfloor \frac{L_{format\,0}}{2} \right\rfloor \qquad \text{[Equation 1]}$$

Here, $L_{format0}$ is the same as the payload size of DCI format 0 before adding CRC. If floor $L_{format0}/2$ is smaller than $L_{format0}/2$, one bit having 0 adds.

10. DCI Format 3A

DCI format 3A is used for transmitting PUCCH and TPC commands for PUCCH and PUSCH by power control of one bit. The following information is transmitted through DCI format 3A.

1) M TPC commands. Here, $L_{format0}$ is the same as the payload size of DCI format 0 before adding CRC.

Refer to 3GPP TS 36.212 V8.7.0(2009-05) 5.3.3.1 for details of the DCI formats.

The following seven downlink transmission modes may be present between the user equipment and the base station:

1. single antenna port: mode in which no precoding is performed
2. transmit diversity: transit diversity may be used for two or four antenna ports that use SFBC.
3. open-loop spatial multiplexing: open-loop mode in which RI feedback-based rank adaptation is possible. If rank is 1, transit diversity may apply. If rank is more than 1, a large delay CDD may be used.
4. closed-loop spatial multiplexing: mode in which precoding feedback applies which supports dynamic rank adaptation.
5. multi user MIMO
6. closed-loop rank 1 precoding
7. single antenna port: mode which may be used for beam-forming when UE-specific reference signal is used.

The following table 1 represents exemplary DCI formats that should be monitored by the user equipment according to the above-described downlink transmission modes.

TABLE 1

| Transmission mode | DCI format to be monitored |
| --- | --- |
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

The following table 2 represents exemplary counts of blind decoding by the user equipment.

TABLE 2

| Search Space Type | Aggregation level L | Size [In CCEs] | Number of PDCCH candidates | DCI formats | # of blind decodings |
| --- | --- | --- | --- | --- | --- |
| UE-specific | 1 | 6 | 6 | 0, 1, 1A, 1B, 1D, 2, 2A | (6 + 6 + 2 + 2) * 2 = 32 |
|  | 2 | 12 | 6 |  |  |
|  | 4 | 8 | 2 |  |  |
|  | 8 | 16 | 2 |  |  |
| Common | 4 | 16 | 4 | 0, 1A, 1C, 3/3A | (4 + 2) * 2 = 12 |
|  | 8 | 16 | 2 |  |  |

As shown in table 2, the user equipment may need to perform blind decoding maximally 44 times. The user equipment may be previously aware of the payload size of the PDCCH that should be detected upon blind decoding by receiving information on the bandwidth of carrier, transmission mode, and number of antenna ports through system information. The user equipment performs blind decoding 44 times in total—one time for each of downlink and uplink, 16*2=32 times in the UE-specific search space and 6*2=12 times in the common search space—targeting the payload size of PDCCH that is already known to the user equipment.

Figure 5:
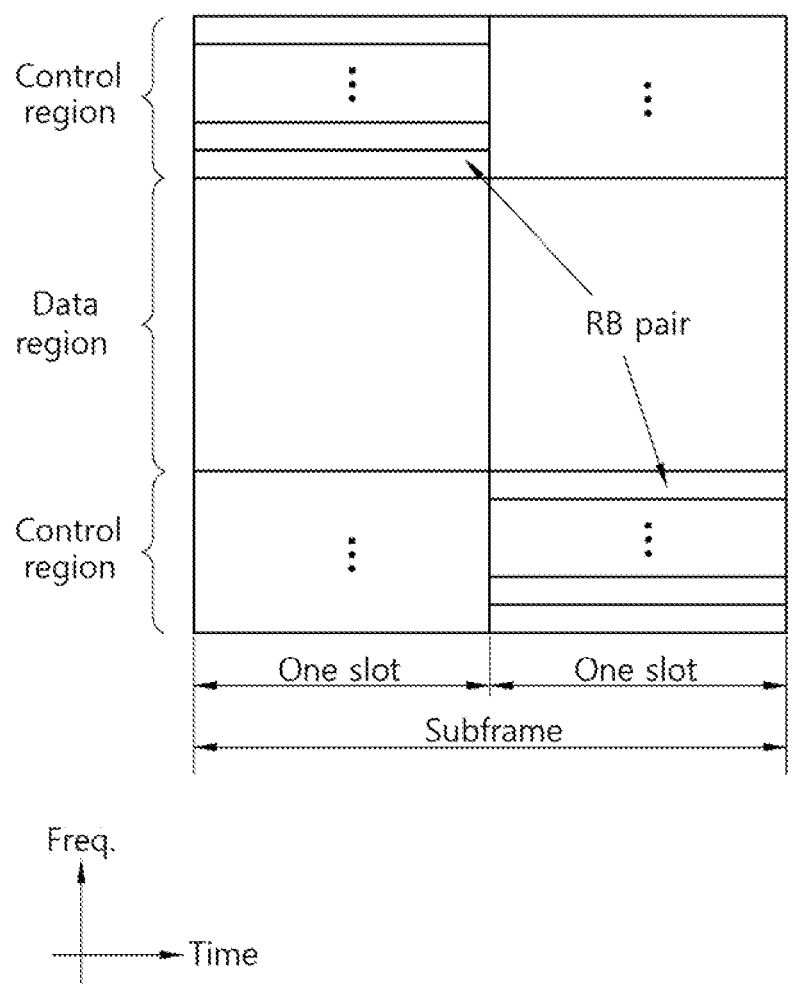
FIG. 5 illustrates a structure of an uplink subframe.

FIG. 5 illustrates a structure of an uplink subframe.

The uplink subframe may be divided into control regions and data regions in the frequency domain. PUCCH (Physical Uplink Control Channel) for transmitting uplink control information is assigned to the control region. PUSCH (Physical Uplink Shared Channel) for transmitting data (as is often case, control information may be transmitted as well) is assigned to the data region. To maintain characteristics of a single carrier, the user equipment does not transmit the PUCCH and PUSCH at the same time.

The PUCCH for one user equipment is assigned as a RB pair in the subframe. The resource blocks belonging to the resource block pair occupy different subcarriers in the first and second slots, respectively. The frequency occupied by the resource block belonging to the resource block pair assigned to the PUCCH varies with respect to the slot boundary. This is referred to as "the RB pair assigned to the PUCCH has been frequency-hopped at the slot boundary." By the user equipment transmitting the uplink control information through different subcarriers over time, it may be possible to obtain a frequency diversity gain.

The uplink control information transmitted over the PUCCH includes HARQ (Hybrid Automatic Repeat reQuest), ACK (Acknowledgement)/NACK (Non-acknowledgement), CQI (Channel Quality Indicator) indicating the status of the downlink channel, SR (Scheduling Request) which is an uplink radio resource allocation request.

The PUSCH is mapped with UL-SCH (Uplink Shared Channel) which is a transport channel. The uplink data transmitted over the PUSCH may be a transport block which is a data block for UL-SCH transmitted during the TTI. The transmission block may include user data. Or, the uplink data may be multiplexed data. The multiplexed data may be data obtained by multiplexing the transmission block for UL-SCH and the control information. For example, the control information multiplexed with data may include CQI, PMI (Precoding Matrix Indicator), HARQ, and RI (Rank Indicator). Or, the uplink data may be constituted of control information alone.

In the LTE-A system, the uplink may adopt SC-FDMA transmission scheme. SC-FDMA is a transmission scheme in which IFFT is performed after DFT spreading. SC-FDMA may be DFT-spread OFDM. In SC-FDMA, PAPR (peak-to-average power ratio) or CM (Cubic Metric) may decrease. When SC-FDMA transmission scheme is used, non-linear distortion section of the power amplifier may be avoided so that the user equipment whose power consumption is limited may have increased transmission power efficiency. Accordingly, user throughput may increase.

Meanwhile, the 3GPP LTE-A system may support carrier aggregation systems. Refer to 3GPP TR 36.815 V9.0.0 (2010-3) for the carrier aggregation systems.

The carrier aggregation system means a system that aggregates one or more carriers having a bandwidth smaller than a targeted broadband when a wireless communication system attempts to support the broadband, thereby configuring the broadband. The carrier aggregation system may be also referred to by other names, such as a multiple carrier system or a bandwidth aggregation system. The carrier aggregation systems may be divided into contiguous carrier aggregation systems having contiguous carriers and non-contiguous carrier aggregation systems having non-contiguous carriers. Hereinafter, the multiple carrier system or carrier aggregation system should be understood as encompassing both the situation where the carrier is contiguous and the situation where the carrier is not contiguous.

In the contiguous carrier aggregation system, a guard band may be present between carriers. Upon aggregating one or more carriers, the bandwidth used for existing systems may be, as is, used for the targeted carrier for backward compatibility with the existing systems. For example, the 3GPP LTE system supports bandwidths of 1.4 MHz, 3 MHz, 5 MHz, 10 MHz, 15 MHz and 20 MHz, and the 3GPP LTE-A system may configure a broadband of 20 MHz or more by using only the bandwidths of the 3GPP LTE system. Or, the 3GPP LTE-A system may configure a broadband by defining a new bandwidth without using the bandwidths of the existing system. The carrier (component carrier) may correspond to each cell.

In the carrier aggregation system, the user equipment may simultaneously transmit or receive one or more carriers according to the capacity of the user equipment. The user equipment following LTE-A standards (LTE-A user equipment) may transmit or receive a plurality of carriers at the same time. The user equipment following LTE Rel-8 standards (LTE user equipment) may transmit or receive only one carrier when each of the carriers constituting the carrier aggregation system is compatible with the LTE Rel-8 system. Accordingly, at least when the number of carriers used for uplink is the same as the number of carriers for downlink, all the component carriers need to be configured to be compatible with the LTE Rel-8 system.

To efficiently use a plurality of carriers, the plurality of carriers may be managed by MAC (Media Access Control).

Figure 6:
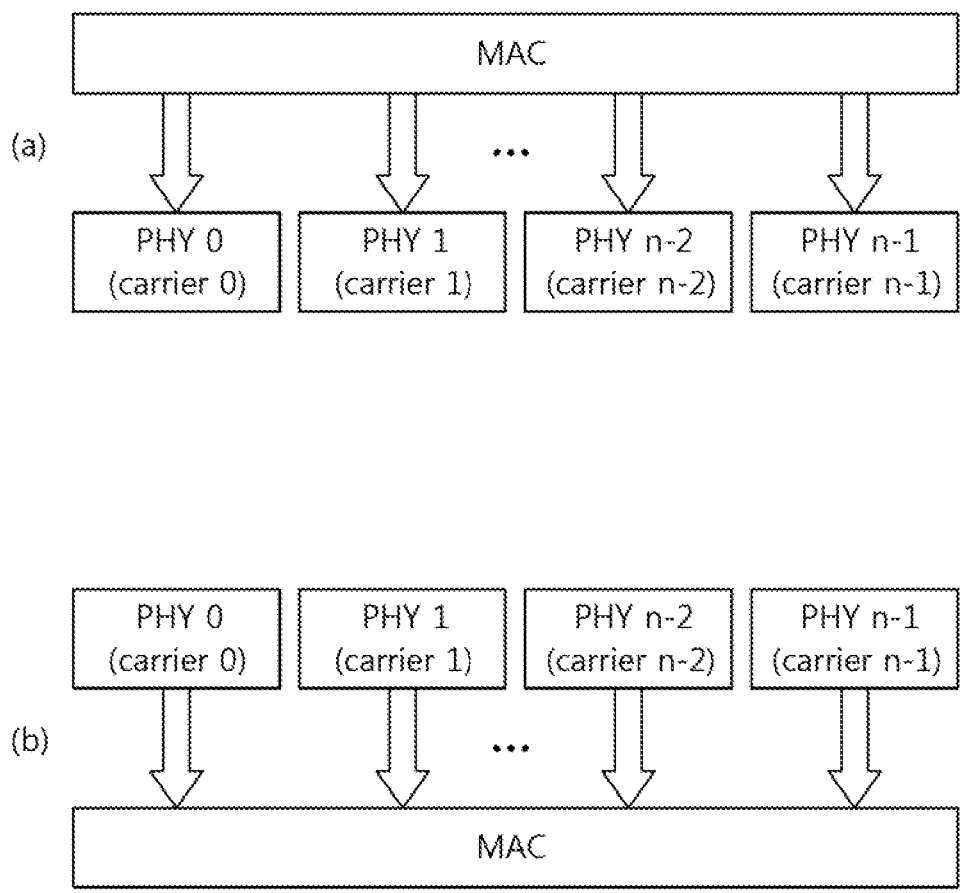
FIG. 6 illustrates an example of a base station and a user equipment that constitutes a carrier aggregation system.

FIG. 6 illustrates an example of a base station and a user equipment that constitutes a carrier aggregation system.

In the base station shown in FIG. 6-(a), one MAC manages and operates all of n carriers and transmits and receives data. This is the same as in the user equipment shown in FIG. 6-(b). In terms of the user equipment, there may be one transport block and one HARQ entity per component carrier. The user equipment may be scheduled for a plurality of carriers at the same time. The carrier aggregation system shown in FIG. 6 may apply to both the contiguous carrier aggregation system and non-contiguous carrier aggregation system. The carriers managed by one MAC need not be adjacent to each other, thus providing flexibility in terms of resource management.

Figure 7:
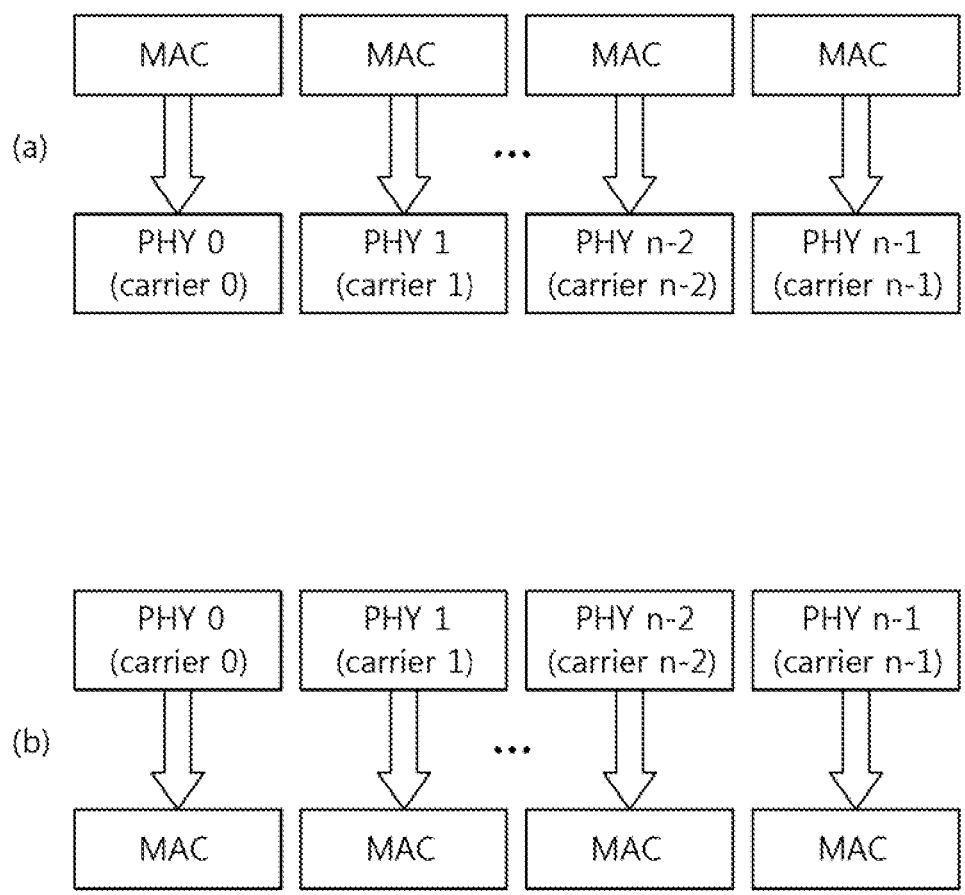
FIGS. 7 and 8 illustrate other examples of a base station and a user equipment that constitute a carrier aggregation system.
Figure 8:
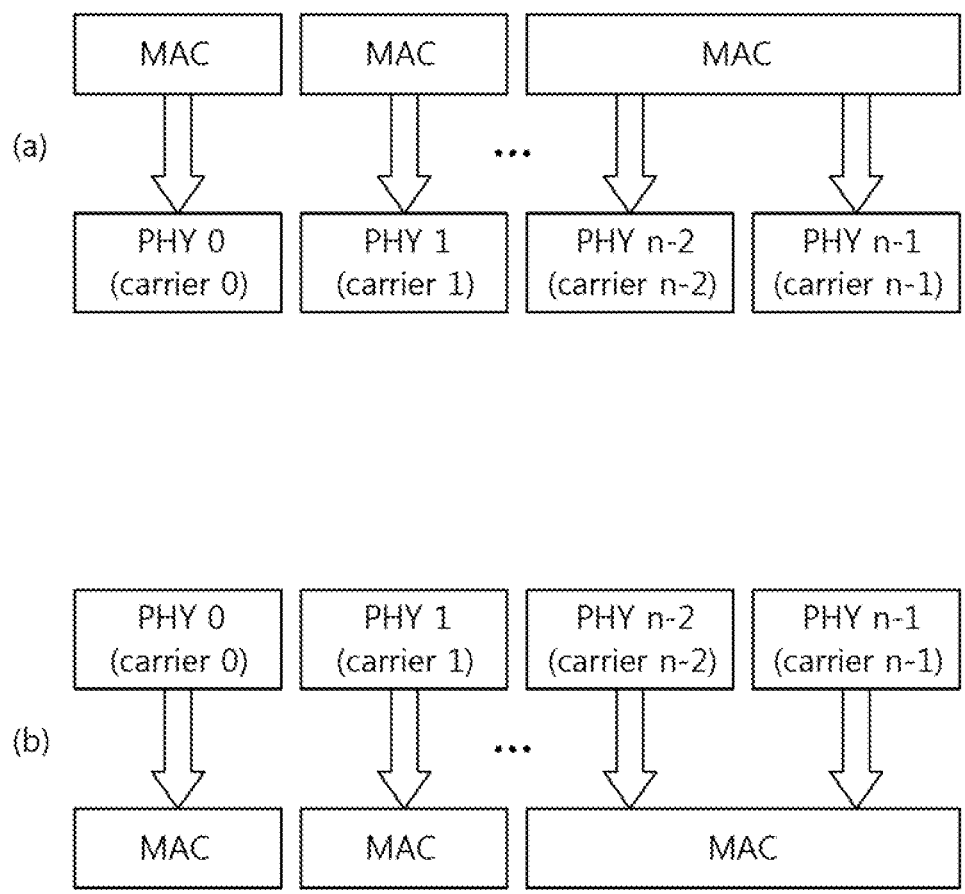

FIGS. 7 and 8 illustrate other examples of a base station and a user equipment that constitute a carrier aggregation system.

In the base station shown in FIG. 7-(a) and the user equipment shown in FIG. 7-(b), one MAC manages only one carrier. That is, the MAC and carrier have a one-to-one correspondence. In the base station shown in FIG. 8-(a) and the user equipment shown in FIG. 8-(b), for some of the carriers, the MAC and the carrier have a one-to-one correspondence whereas for the remaining carriers, one MAC controls a plurality of carriers. That is, various combinations for correspondences between the MAC and carrier are possible.

The carrier aggregation system shown in FIGS. 6 to 8 include n carriers which may be adjacent to or away from each other. The carrier aggregation system may apply to both uplink and downlink. In the TDD system, each carrier is configured to be able to perform uplink transmission and downlink transmission, and in the FDD system, a plurality of carriers may be used separately between uplink and downlink—that is, with the plurality of carriers separated into carriers for uplink and carriers for downlink. In the general TDD system, the number of component carriers used for uplink and the bandwidth of each carrier used for uplink are the same as the number of component carriers used for downlink and the bandwidth of each carrier used for downlink. In the FDD system, it may be possible to configure an asymmetric carrier aggregation system by making the number of carriers used for uplink and the bandwidth of each carrier for uplink different from the number of carriers used for downlink and the bandwidth of each carrier for downlink.

Hereinafter, each carrier that may be used to configure a broadband carrier in the multi-carrier system (carrier aggregation system) is referred to as a "component carrier (CC)". The component carrier may use, as is, the bandwidth used in the existing system to backward compatibility with the existing system. For example, since the 3GPP LTE system supports the bandwidth, such as 1.4 MHz, 3 MHz, 5 MHz, 10 MHz, 15 MHz and 20 MHz, in the 3GPP LTE-A system, each component carrier may have a bandwidth of one of 1.4 MHz, 3 MHz, 5 MHz, 10 MHz, 15 MHz and 20 MHz, and when a broadband of 20 MHz or higher, a plurality of component carriers may be aggregated. Hereinafter, for convenience, the component carrier used for uplink is simply referred to as UL CC (uplink component carrier) and the component carrier used for downlink is simply referred to as DL CC (downlink component carrier).

FIG. 9 illustrates an example of a DL/UL asymmetric carrier aggregation system according to the present invention.

FIG. 9-(a) illustrates an example where the number of DL component carriers is more than the number of UL component carriers, and FIG. 9-(b) illustrates an example where the number of UL component carriers is more than the number of DL component carriers. Although in FIG. 9-(a) two DL component carriers are linked with one UL component carrier, and in FIG. 9-(b), one DL component carrier is linked to two UL component carriers, the number of the DL component carriers or the UL component carriers and the ratio in which the DL component carriers are linked to the UL component carriers may vary, and what is suggested herein may also apply to a symmetric carrier aggregation system in which the component carriers constituting DL are one-to-one associated with the component carriers constituting UL.

In the LTE-A system, the carrier having backward compatibility, in consideration of compatibility with the conventional 3GPP LTE system, may be accessible by the conventional user equipment and may serve as an independent carrier or as part of an aggregation of carriers. The carrier having backward compatibility is always configured as a DL-UL pair in the FDD system. On the contrary, a carrier without backward compatibility is newly defined without considering compatibility with the user equipment operating in the conventional LTE system, and thus, not accessible by the conventional user equipment.

As a type of using one or more carriers in the carrier aggregation system, a cell-specific or/and UE-specific method may be considered. Hereinafter, the cell-specific method means a carrier configuration in terms of some cell or base station and the UE-specific method means a carrier configuration in terms of the UE.

The cell-specific carrier aggregation may be a type of carrier aggregation that is set by some base station or cell. In the case of FDD systems, the cell-specific carrier aggregation may have a type in which association between DL and UL is determined depending on Tx-Rx separation specified in 3GPP LTE release-8/LTE-A. For example, the carrier frequency in uplink or downlink may be designated by the E-UTRA Absolute Radio Frequency Channel Number (EARFCN), which ranges from 0 to 65535. The relationship in carrier frequency in the unit of MHz between the EARFCN and downlink is given in the following equation:

$$F_{DL} = F_{DL\_low} + 0.1(N_{DL} - N_{Offs-DL})$$ [Equation 2]

In the above equation, $N_{DL}$ is a downlink EARFCN, and $F_{DL\_low}$ and $N_{Offs-DL}$ are given in the following table:

TABLE 3

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 6001199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |

TABLE 3-continued

| E-UTRA Operating Band | Downlink | | | Uplink | | |
|---|---|---|---|---|---|---|
| | $F_{DL-low}$ (MHz) | $N_{Offs-DL}$ | Range of $N_{DL}$ | $F_{UL-low}$ (MHz) | $N_{Offs-UL}$ | Range of $N_{UL}$ |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

NOTE:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

The E-UTRA transmit channel (carrier centre frequency)-receive channel (carrier centre frequency) separation according to the bandwidths of the transmit channel and receive channel may be specified in the following table:

TABLE 4

| Frequency Band | TX-RX carrier centre frequency separation |
|---|---|
| 1 | 190 MHz |
| 2 | 80 MHz. |
| 3 | 95 MHz. |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |

In connection, refer to 3GPP TS 36.101 V8.4.0, Ch. 5.7 released in December, 2008.

In the carrier aggregation system, the PDCCH monitoring DL CC aggregation (hereinafter, simply referred to as monitoring DL CC aggregation) means an aggregation of DL CCs that monitor a control channel through which the specific user equipment may receive control information—that is PDCCH. The monitoring DL CC aggregation may be set UE-specifically or cell-specifically.

Cross-carrier scheduling is a scheduling scheme that, through PDCCH transmitted over a specific component carrier, performs resource allocation of PDSCH transmitted over another component carrier and/or resource allocation of PUSCH transmitted over a component carrier other than a component carrier basically linked to the specific component carrier. That is, the PDCCH and the PDSCH may be transmitted through different DL CCs, and the PUSCH may be transmitted through an UL CC other than an UL CC basically linked to the DL CC through which the PDCCH having UL grant is transmitted. As such, in the system supporting cross-carrier scheduling, a carrier indicator is needed that indicates the PDSCH/PUSCH where the PDCCH provides control information are transmitted through what DL CC/UL CC. The field containing such carrier indicator is hereinafter referred to as a carrier indication field (CIF).

Figure 10:
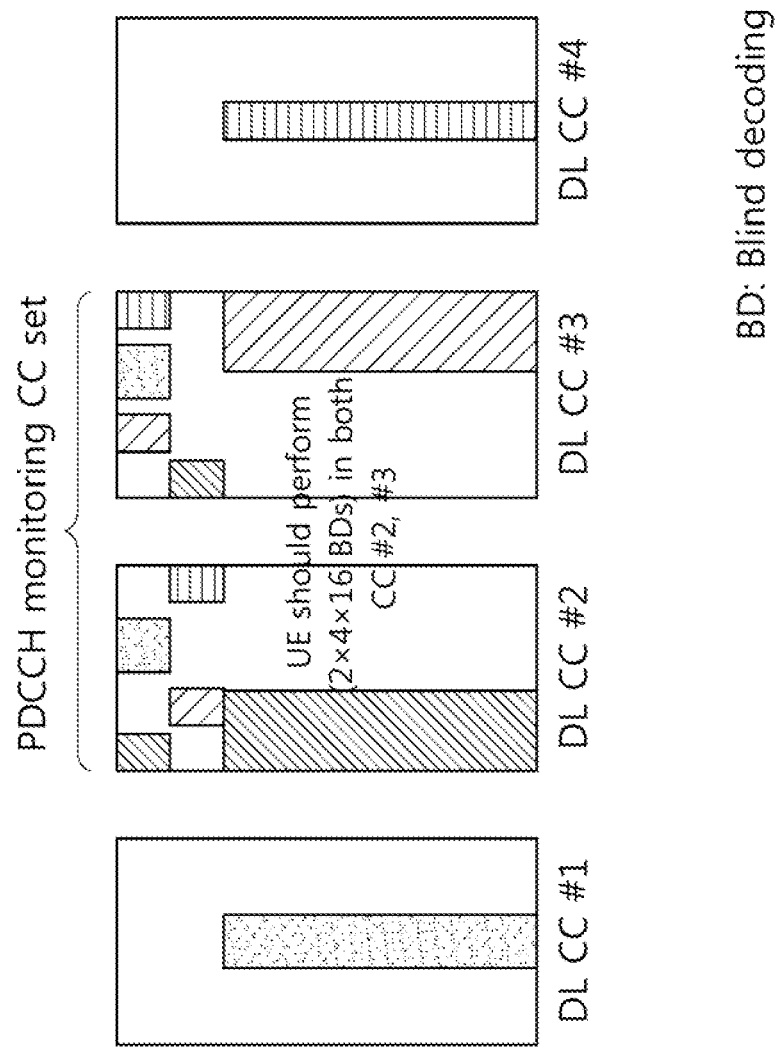
FIG. 10 illustrates an example of a DCI format.

FIG. 10 illustrates an example of a DCI format.

Referring to FIG. 10, the multi-carrier system supporting the cross-carrier scheduling may further include a carrier indication field (CIF) in the above-described existing DCI format (which may be implemented in m bits). For example, in the LTE-A system, the CIF may be added to the existing DCI format (that is, DCI format used in LTE) so that the bit size of the DCI format may be expanded to n bits (e.g., 1 to 3 bits), and the PDCCH structure may reuse the existing coding scheme and resource allocation scheme (that is, CCE-based resource mapping).

The multi-carrier system supporting the cross-carrier scheduling may support non-cross-carrier scheduling as well. The non-cross-carrier scheduling is a scheduling scheme in which resource allocation of the PDSCH of the same component carrier is performed through the PDCCH transmitted over a specific component carrier, and resource allocation of the PUSCH transmitted over one component carrier linked to the specific component carrier is performed. The non-cross-carrier scheduling may not include the CIF.

The base station may semi-statically set whether to activate the cross-carrier scheduling. That is, the base station may semi-statically set whether a CIF is included in the DCI format in a UE-specific (or UE group) or cell-specific manner. Such semi-static setting may reduce signaling overhead between the base station and the user equipment.

When the cross-carrier scheduling is activated, the number of times of blind decoding may be determined depending on whether a linkage is established between the monitoring DL CC and the scheduled DL CC. Here, the scheduled DL CC means a DL CC scheduled by downlink control information that is transmitted through the monitoring DL CC.

Figure 11:
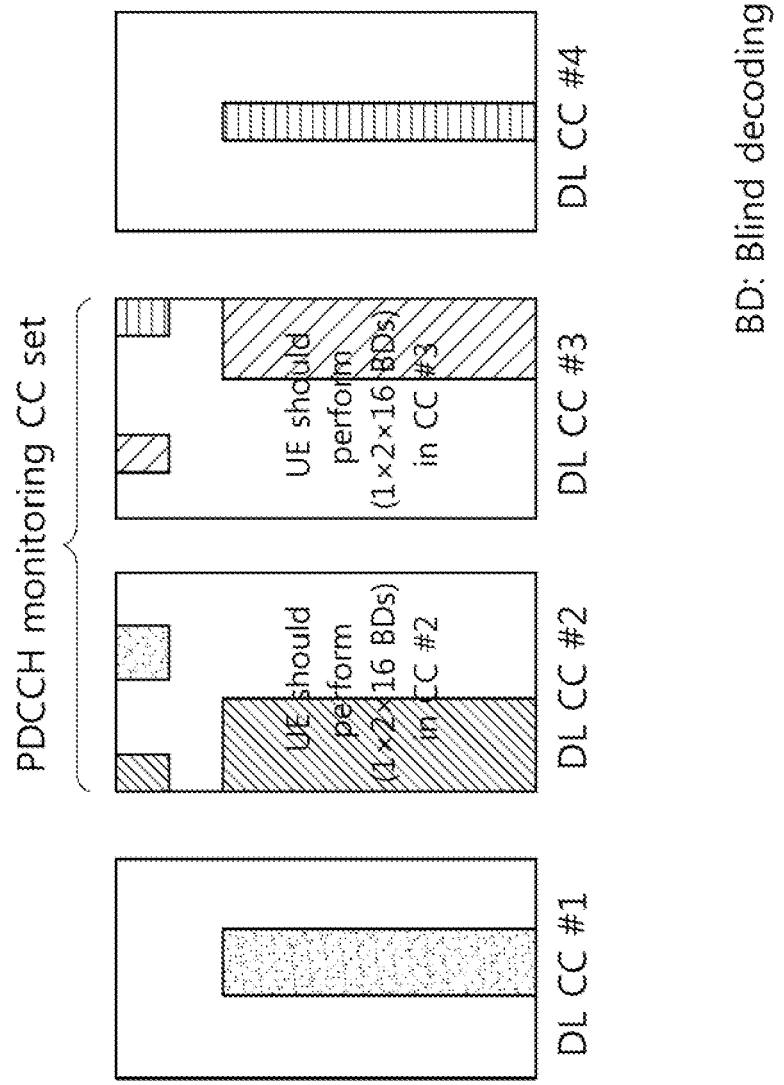
FIG. 11 illustrates an example where no linkage is established between the monitoring DL CC and the scheduled DL CC.

FIG. 11 illustrates an example where no linkage is established between the monitoring DL CC and the scheduled DL CC.

Referring to FIG. 11, the monitoring DL CC aggregation includes DL CC#2 and DL CC#3, and the scheduled DL CC is DL CC#1 to DL CC#4. In the case that there is no linkage between the monitoring DL CC and the scheduled DL CC, the user equipment should perform blind decoding for detecting PDCCH for all the scheduled DL CCs in each monitoring DL CC. That is, the user equipment attempts to detect PDCCH for DL CC#1, DL CC#2, DL CC#3, and DL CC#4 in the control region of DL CC#2 and attempts to detect PDCCH for DL CC#1 to DL CC#4 in the control region of DL CC#3. Accordingly, the total number of times of blind decoding that should be performed by the user equipment in the UE-specific search space so as to detect DCI associated with downlink is 2×4×16=128 counts.

Figure 12:
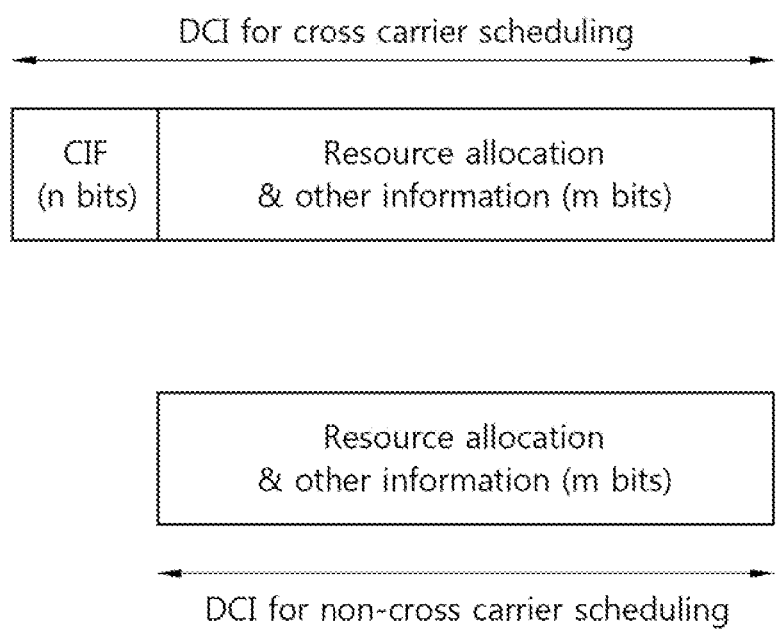
FIG. 12 illustrates an example where there is a linkage between the monitoring DL CC and the scheduled DL CC.

FIG. 12 illustrates an example where there is a linkage between the monitoring DL CC and the scheduled DL CC.

Referring to FIG. 12, the monitoring DL CC aggregation includes DL CC#2 and DL CC#3, and the scheduled DL CC is DL CC#1 to DL CC#4. At this time, there may be a linkage that PDCCH for DL CC#1 and DL CC#2 may be transmitted in the control region of DL CC#2, and PDCCH for DL CC#3 and DL CC#4 may be transmitted in the control region of DL CC#3. Such linkage may be previously defined between the user equipment and the base station or sent from the base station to the user equipment through an upper layer signal such as RRC.

As such, in the case that there is an linkage between the monitoring DL CC and the scheduled DL CC, the number of times of blind decoding that should be performed by the user equipment decreases. For example, considering the number of times of blind decoding that should be performed by the user equipment in the UE-specific search space so as to detect DCI associated with downlink, the user equipment is aware that in the control region of DL CC#2, only the PDCCH for DL CC#1 and DL CC#2 may be transmitted, and thus, it is enough for the user equipment to perform the blind decoding 1×2×16=32 times. Accordingly, the total number of times of blind decoding that should be performed by the user equipment is 64. That is, it may be possible to considerably reduce the number of times of blind decoding compared to 128 counts as described in connection with FIG. 10. As such, in the case that there is a linkage between the monitoring DL CC and the scheduled DL CC, the number of times of blind decoding that should be performed by the user equipment may be sharply reduced.

Figure 13:
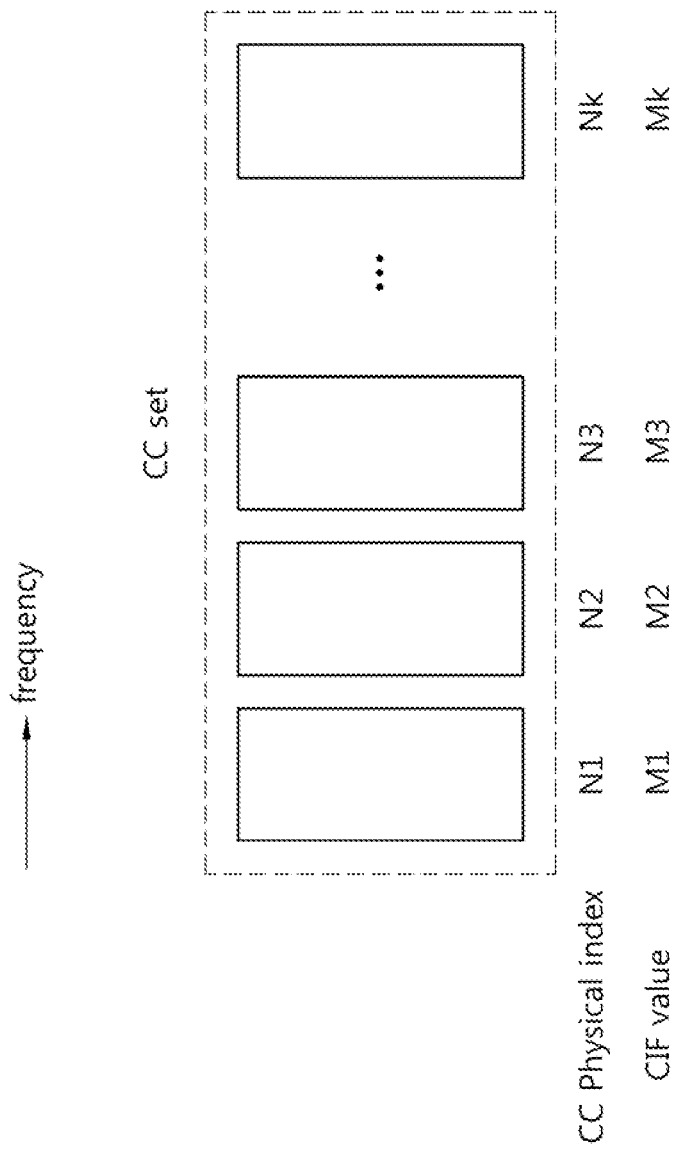
FIG. 13 illustrates logical indexing of CIF values for a plurality of component carriers.

FIG. 13 illustrates logical indexing of CIF values for a plurality of component carriers.

The unique index of each component carrier to identify a plurality of component carriers may be referred to as a physical index. That is, the physical index may be a unique value for each component carrier. For example, assume that the component carrier aggregation having different frequencies includes CC 0, CC 1, CC 2, . . . , CC K. The physical index of each component carrier may be given as N1, N2, . . . , Nk as the unique value for each component carrier. At this time, the CIF value indicating each component carrier may be given as M1, M2, . . . , Mk. Here, Nn and Mn (n is one of 1 to k) may have the same value or different values. The base station may notify the user equipment of a setting between the physical index of the component carrier and the CIF value, that is, a mapping relationship. Hereinafter, although it is described as an example that the base station notifies the user equipment of the mapping relationship through the upper layer signal such as RRC message, the embodiments of the present invention are not limited thereto. The mapping relationship between the component carrier and the CIF value may change. For example, in the case that the component carriers assigned to the user equipment increase or decrease, the CIF value may change or even when the component carriers assigned to the user equipment do not change, the CIF value may change according to a specific condition.

For example, assume that the mapping relationship between the component carrier and the CIF value changes from a first mapping relationship to a second mapping relationship and the base station may arbitrarily set the mapping relationship between the component carrier and the CIF value. Then, for example, in the first mapping relationship, the component carriers assigned to the user equipment may be CC 0 and CC2, and the CIF value indicating CC 0 may be 0 and the CIF value indicating CC 2 may be 1. In the second mapping relationship, the component carriers assigned to the user equipment may be CC 0, CC 2, and CC 3, and the CIF value indicating CC 0 may be 1, the CIF value indicating CC 2 may be 2, and the CIF value indicating CC 3 may be 3. Then, in the first mapping relationship, the CIF value 1 may indicate CC 2 while in the second mapping relationship the CIF value 1 may indicate CC 0.

The base station may transmit information relating to the second mapping relationship between the component carrier and the CIF value—that is, CIF resetting message—to the user equipment through the RRC message. The user equipment notifies the base station of whether to receive the CIF resetting message by transmitting ACK/NACK information. Upon receiving ACK, the base station transmits DCI according to the second mapping relationship. In the case of successfully decoding the DCI according to the second mapping relationship, the user equipment transmits a resetting complete message.

When changing the mapping relationship between the component carrier and the CIF as in the process of changing the CIF setting between the base station and the user equipment, an ambiguous period or transition period may be present. The ambiguous period (or transition period) may be defined as a period from the subframe when the base station performs subsequent transmission to the user equipment after receiving ACK from the user equipment to the subframe when the base station performs subsequent transmission to the user equipment after receiving the resetting complete message from the user equipment. Such ambiguous period is considered, for example, because of the likelihood of error occurrence as in the example where although the user equipment actually transmits NACK in response to the CIF resetting message from the base station, the base station receives ACK due to errors. If the user equipment transmits ACK and the base station, right away, transmits DCI according to the second mapping relationship, normal transmission of control signals/data between the base station and the user equipment may be impossible. This is why the user equipment may interpret the DCI according to the second mapping relationship as the DCI according to the first mapping relationship and thus may attempt to receive control signals/data through the component carrier which is not indicated b the base station.

Figure 14:
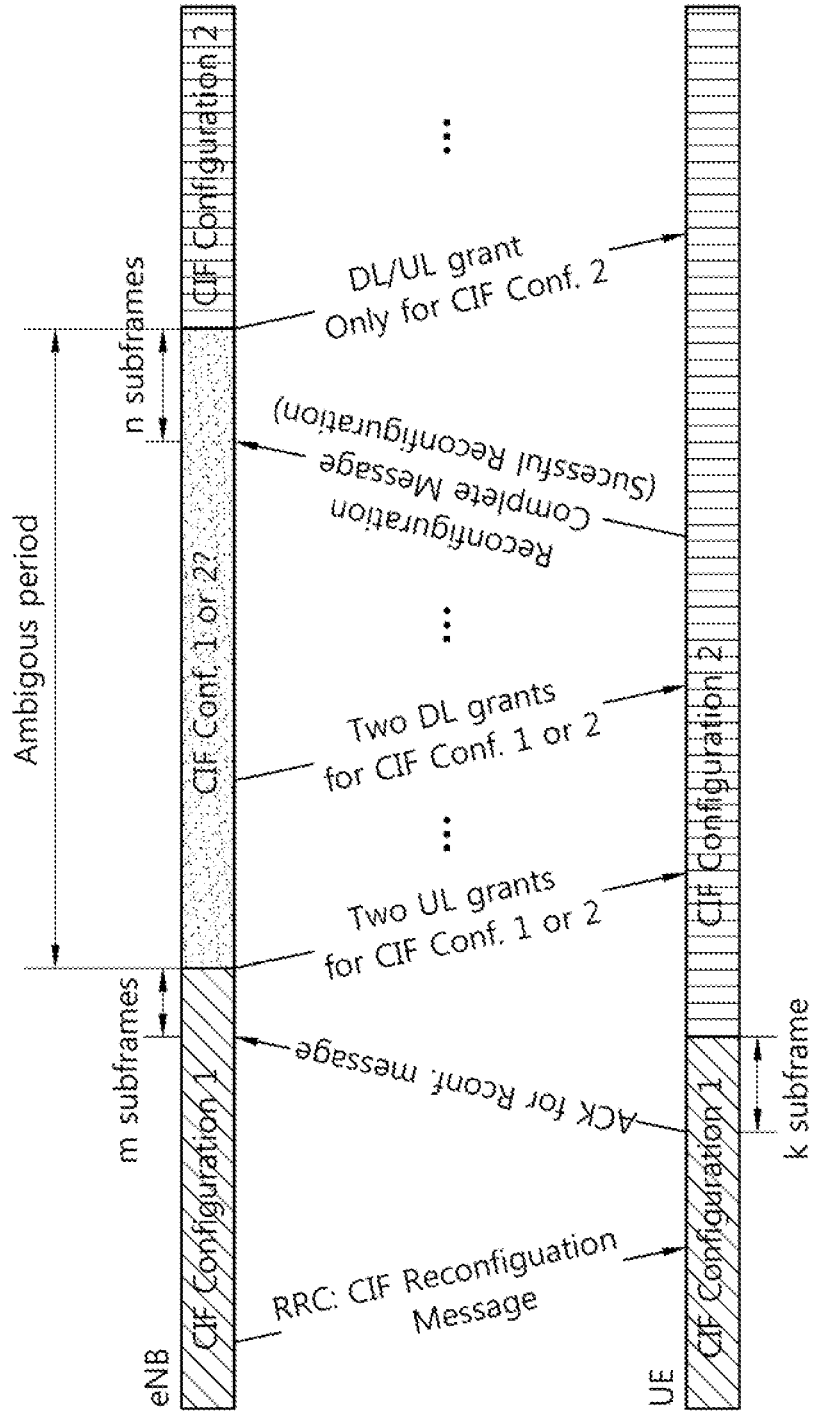
FIG. 14 illustrates an example of changing a CIF setting between the base station and the user equipment.

FIG. 14 illustrates an example of changing a CIF setting between the base station and the user equipment.

Referring to FIG. 14, the base station may transmit information relating to the mapping relationship between the component carrier and the CIF value—that is, CIF resetting message—to the user equipment through the RRC message.

The user equipment notifies the base station of whether to receive the CIF resetting message by transmitting ACK/NACK information. The base station transmits two types of DCI m subframes after the subframe when the ACK is received. When the mapping relationship between the component carrier and the CIF value before transmitting the CIF resetting message is a first mapping relationship, and the mapping relationship between the component carrier changed by the CIF resetting message and the CIF value is a second mapping relationship, the base station transmits DCI according to the first mapping relationship together with DCI according to the second mapping relationship. Accordingly, even when failing to completely change the setting to the second mapping relationship, the user equipment may receive the DCI according to the first mapping relationship.

In the case that the user equipment successfully decodes the DCI according to the second mapping relationship, the user equipment transmits a resetting complete message to the base station. The base station establishes the setting of the CIF according to the second mapping relationship n subframes after the subframe when the resetting complete message is received and transmits the DCI to the user equipment. Only when receiving the resetting complete message from the user equipment after transmitting the CIF resetting message, the base station may be aware that mapping between the component carrier and CIF value has been changed without errors.

Hereinafter, a method of setting mapping between the component carrier and the CIF value when the mapping relationship between the component carrier and the CIF value needs to be changed, for example, when a new component carrier is added that is to communicate with the user equipment or when one or more component carriers are removed from the component carrier aggregation currently in communication will be described.

The base station transmits first CIF setting information to the user equipment to notify the user equipment of the first mapping relationship between the CIF value and the component carrier. Then, when the mapping between the component carrier and the CIF value needs to be changed, the base station transmits second CIF setting information to the user equipment to notify the user equipment of the second mapping relationship. At this time, the base station performs mapping change of the component carrier and the CIF value, that is, change from the first mapping relationship to the second mapping relationship, in consideration of the following conditions.

1. upon addition or removal of the component carrier, it is preferable to maintain the same mapping between the CIF value and the component carrier before change.

2. the lowest or highest value among the available CIF values may be mapped to a newly added component carrier, and such value may be signaled by a physical layer signal, such as L1 signal, or the upper layer signal, such as RRC.

3. when addition and removal of a component carrier are performed at the same time, the CIF value is first assigned to the added component carrier. That is, addition of a component carrier has higher priority than removal of a component carrier.

4. when a plurality of component carriers are added at the same time, the lowest CIF value (or highest CIF value) is mapped to the component carrier having the lowest physical index among the added component carriers.

5. in some cases, an added component carrier may be mapped with some CIF value, and the mapped CIF value may be signaled as RRC or L1 signal.

Hereinafter, a method of changing the setting of mapping relationship between the component carrier (CC) and the CIF value considering the above-described conditions will be described, wherein there are five component carriers and five assignable CIF values, i.e., (0, 1, 2, 3, 4)0.

FIGS. 15 to 19 illustrate examples of settings of CCs and CIF values.

When a UE-specific CC aggregation includes five CCs, the CCs may be CC0, CC1, CC2, CC3, and CC4. In each of the figures, the mapping relationship between the component carrier and the CIF value shown at the upper side is referred to as the first mapping relationship, and the mapping relationship between the component carrier and the CIF value shown at the lower side is referred to as the second mapping relationship.

Figure 15:
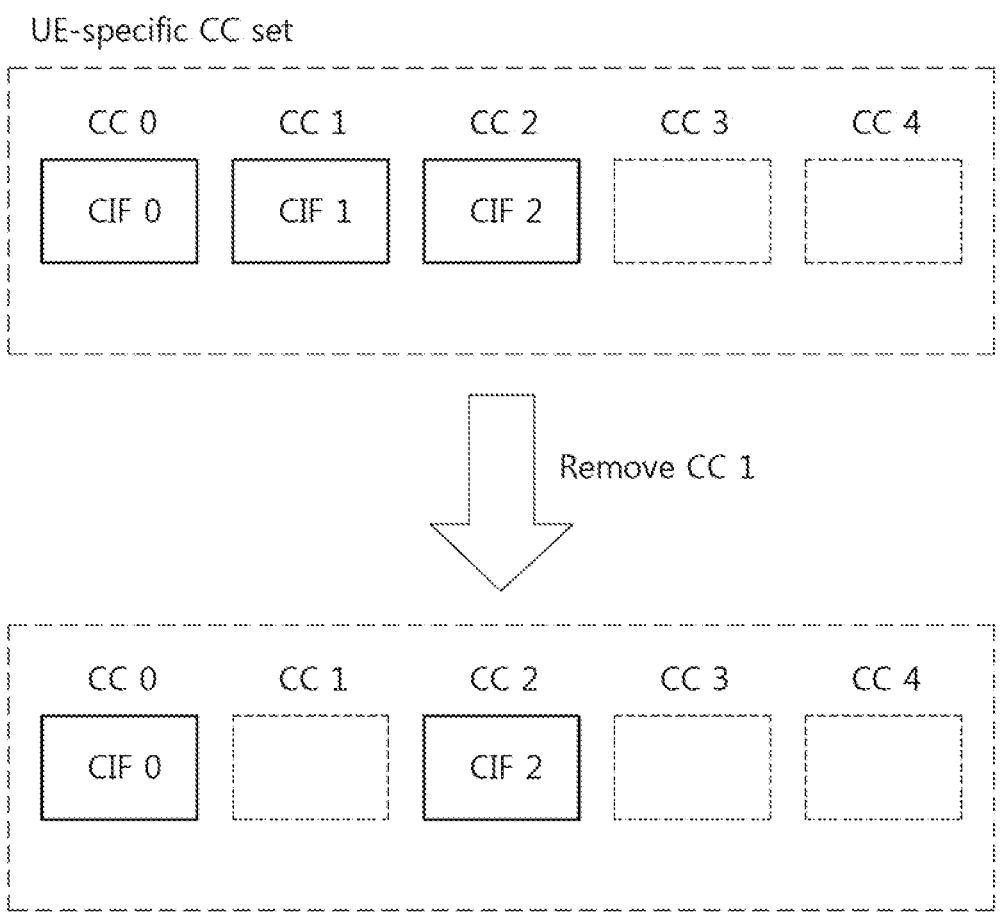

Referring to FIG. 15, CC 0, CC 1, and CC 2 are activated and assigned to the user equipment. That is, according to the first mapping relationship, the CIF value indicating CC 0 is 0, the CIF value indicating CC 1 is 1, and the CIF value indicating CC 2 is 2.

Depending on channel environments or changes in the amount of data transmitted, the CC assigned by the base station to the user equipment may change. For example, the base station may assign the user equipment with only CC 0 and CC 2 except CC 1. At this time, it is preferable to keep the CIF values for CC 0 and CC 2 the same before and after change. Accordingly, according to the second mapping relationship, the CIF value indicating CC 0 is 0, and the CIF value indicating CC 2 is 2. That is, except for CC 1 that is removed from the component carrier aggregation, the mapping relationship between the CIF value and the CC is kept the same.

Referring to FIG. 16, with CC0 and CC 2 assigned to the user equipment, CC 3 may be also added. In such case, the CIF values for CC 0 and CC 2 are kept the same before and after change, and the CIF value for the newly added CC 3 may be the smallest value (i.e. 1) among the CIF values {1, 3, 4} which are currently assignable. Or, among the currently assignable CIF values, the largest value (i.e., 4) may be assigned. Or, among the currently available CIF values, any one may be selected and notified by signaling.

Figure 17:
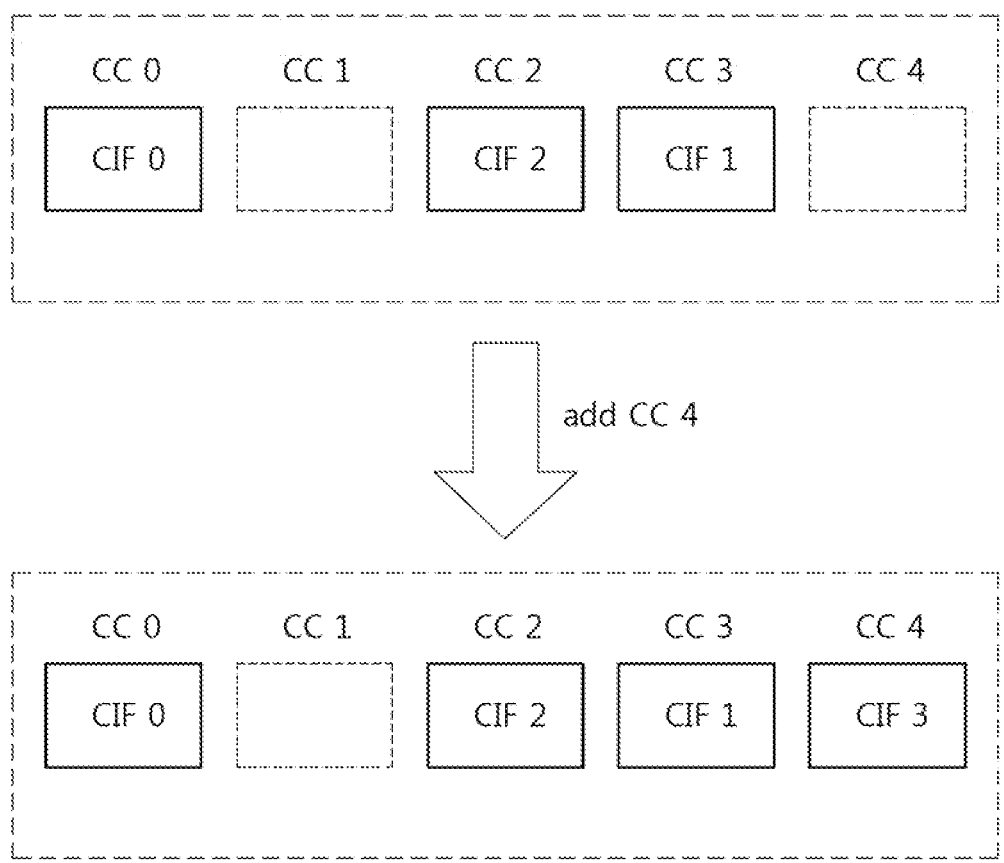

Referring to FIG. 17, with CC 0, CC 2, and CC 3 assigned to the user equipment, CC 4 may be added. In such case, as described in connection with FIG. 16, the CIF values for CC 0, CC 2, and CC 3 may be kept the same before and after change, and the CIF value for the newly added CC 4 may be the smallest or largest value among the currently available CIF values {3, 4}. Or, among the currently available CIF values, any one may be chosen and notified by signaling.

Referring to FIG. 18, with CC 0, CC 2, CC 3, and CC 4 assigned to the user equipment, CC 1 may be added while CC 2 and CC 3 are simultaneously removed. In such case, it is preferable that after performing mapping of CIF value for the newly added CC, the CIF value for the removed CC is removed. If the CIF value for the added CC is added after the CIF value for the removed CC is removed, the CIF value for the removed CC may be added to the newly added CC so that confusion may occur in mapping between the CC and the CIF value.

Figure 19:
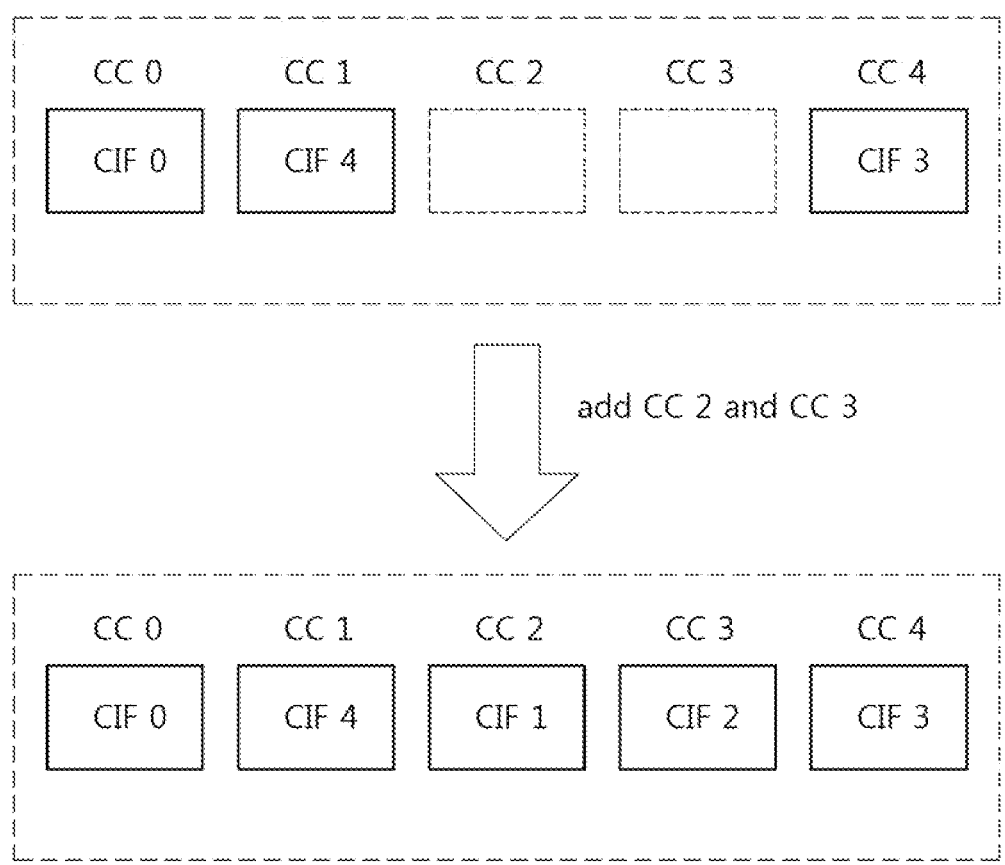

Referring to FIG. 19, with CC 0, CC 1, and CC 4 assigned to the user equipment, CC 2 and CC 3 may be added. That is, a plurality of CCs may be simultaneously added. In such case, the lowest (smallest) CIF value is assigned to the CC having the lowest physical index with the physical indexes of the added plurality of CCs, and the remaining CIF values may be assigned to the CCs having higher physical indexes in ascending order. On the contrary, the highest (largest) CIF value may be assigned to the CC having the lowest physical index and the remaining CIF values may be assigned to the CCs having higher physical indexes in descending order. Or, some CIF value may be assigned to each CC and signaled by the base station.

As described above, the number of component carriers assigned to the user equipment changes, at least one component carrier is configured to be assigned with the same CIF value in the component carrier-CIF value mapping relationship before and after change. As such, through at least one component carrier whose CIF value does not change, the base station may transmit information, such as downlink control information (DCI), system information, first CIF setting information, or second CIF setting information.

The above examples are associated with when the number of component carriers is the same as the number of assignable CIF values. However, in some cases, the number of component carriers may be more than the number of CIF values, and all of the CIF values may be used for activated component carriers. At this time, n new component carriers may be added while m component carriers may be removed (where, m is equal to or larger than n). In such case, the component carrier is first removed, and the CIF value assigned to the removed component carrier may be mapped with the added component carrier. Among the CIF values assigned to the removed component carriers, the lowest CIF value or the highest CIF value may be assigned to the component carrier having the lowest physical index (or the component carrier having the highest physical index) among the added component carriers.

Or, among the CIF values for the removed component carriers, some CIF value may be mapped with the added component carrier and may be then signaled.

Figure 20:
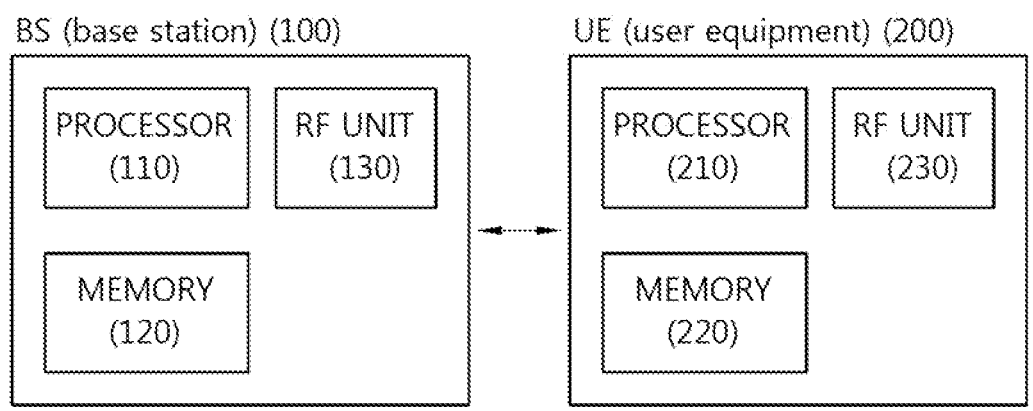
FIG. 20 is a block diagram illustrating a base station and a user equipment.

FIG. 20 is a block diagram illustrating a base station and a user equipment.

The base station 100 includes a processor 110, a memory 120, and a RF (Radio Frequency) unit 130. The processor 110 implements a suggested function, process, and/or method. For example, the processor 110 transmits the first CIF setting information to notify the user equipment of the first mapping relationship between the CIF value and the component carrier, downlink control information (DCI) including the carrier indication field, and the second CIF setting information to notify the user equipment of the second mapping relationship between the CIF value and the component carrier. The memory 120 is connected to the processor 110 and stores various types of information to drive the processor 110. The RF unit 130 is connected to the processor 110 and transmits and/or receives wireless signals.

The user equipment 200 includes a processor 210, a memory 220, and a RF unit 230. The processor 210 implements a suggested function, process, and/or method. For example, the processor 210 receives the first CIF setting information or the second CIF setting information to thereby grasp the mapping relationship between the component carrier and the CIF value. When the mapping relationship between the component carrier and the CIF value changes, the DCI is received through at least one component carrier whose CIF value is not changed. The memory 220 is connected to the processor 210 and stores various types of information to drive the processor 210. The RF unit 230 is connected to the processor 210 and transmits and/or receives wireless signals.

The processor 110 or 210 may include a converter that converts signals from ASICs (Application-Specific Integrated Circuits), different chipsets, logic circuits, data processing devices, and/or baseband signals and wireless signals to each other. The memory 120 or 220 may include ROMs (Read-Only Memories), RAMs (Random Access Memories), flash memories, memory cards, storage media, and/or other storage devices. The RF unit 130 or 230 may include one or more antennas to transmit and/or receive wireless signals. When the embodiments are implemented in software, the above-described schemes may be implemented in modules (procedures or functions) that perform the above-described functions. The modules may be stored in the memory 120 or 220 and may be executed by the processor 110 or 210. The memory 120 or 220 may be positioned inside or outside the processor 110 or 210, and may be connected to the processor 110 or 210 via various well-known means.

Although the embodiments of the present invention have been described, it will be understood by those skilled in the art that various modifications or variations may be made to the present invention without departing from the technical spirit or scope of the invention. Accordingly, the present invention is not limited to the embodiments and includes all the embodiments within the appended claims.

The invention claimed is:

1. A method of setting a carrier indication field (CIF) that indicates a component carrier in a multi-carrier system that uses a plurality of component carriers, the method performed by a base station and comprising:
    transmitting, to a user equipment (UE), information that changes a number of component carriers assigned to the UE,
    wherein the information maps a to-be-assigned component carrier to a CIF value and maps the CIF value to each of an Absolute Radio Frequency Channel Number (ARFCN) and a physical index, and
    wherein, when the number of component carriers assigned to the UE is changed by the information, at least one of the assigned component carriers is mapped to a same CIF value before and after the change.

2. The method of claim 1, wherein the information is included in a radio resource control (RRC) message.

3. The method of claim 1, further comprising transmitting downlink control information (DCI) including the CIF, wherein a value of the CIF indicates the component carrier that is scheduled by the DCI.

4. The method of claim 1, wherein the CIF has a size of 3 bits.

5. The method of claim 1, wherein the information is transmitted through the at least one assigned component carrier mapped to the same CIF value.

6. A UE (user equipment) configured to receive a carrier indication field (CIF) that indicates a component carrier in a multi-carrier system that uses a plurality of component carriers, the UE comprising:
    an RF (radio frequency) unit configured for transmitting or receiving radio signals; and
    a processor connected to the RF unit and configured
        receive, from a base station, information that changes a number of component carriers assigned to the UE,
        wherein the information maps a to-be-assigned component carrier to a CIF value and maps the CIF value to each of an Absolute Radio Frequency Channel Number (ARFCN) and a physical index, and
        wherein, when the number of component carriers assigned to the UE is changed by the information, at least one of the assigned component carriers is mapped to a same CIF value before and after the change.

7. The UE of claim 6, wherein the information is received in a radio resource control (RRC) message.

8. The UE of claim 6, wherein the processor is further configured for receiving downlink control information (DCI) including the CIF, wherein a value of the CIF indicates the component carrier that is scheduled by the DCI.

9. The UE of claim 6, wherein the CIF has a size of 3 bits.

10. The UE of claim 6, wherein the information is transmitted through the at least one assigned component carrier mapped to the same CIF value.

11. A method of setting a carrier indication field (CIF) that indicates a component carrier in a multi-carrier system that uses a plurality of component carriers, the method performed by a UE (user equipment) and comprising:

receiving, from a base station, information that changes a number of component carriers assigned to the UE, wherein the information maps a to-be-assigned component carrier to a CIF value and maps the CIF value to each of an Absolute Radio Frequency Channel Number (ARFCN) and a physical index, and wherein, when the number of component carriers assigned to the UE is changed by the information, at least one of the assigned component carriers is mapped to a same CIF value before and after the change.

12. The method of claim 11, wherein the information is transmitted through the at least one assigned component carrier mapped to the same CIF value.

\* \* \* \* \*